United States Patent [19]

Kübler

[11] 4,227,057
[45] Oct. 7, 1980

[54] APPARATUS FOR ASCERTAINING THE UPPER LEVEL OF LIQUIDS IN TANKS OR THE LIKE

[76] Inventor: Wolfgang Kübler, Industriestrasse 31,, CH-6300 Zug, Switzerland

[21] Appl. No.: 26,671

[22] Filed: Apr. 3, 1979

[30] Foreign Application Priority Data

Apr. 13, 1978 [CH] Switzerland .................. 3981784/78

[51] Int. Cl.$^2$ ........................................... H01H 35/18
[52] U.S. Cl. ................................. 200/84 C; 335/206; 73/313; 338/215
[58] Field of Search ................ 335/206; 361/331, 380; 200/84 R, 84 C, 61.2; 73/308, 313, 322.5; 340/623, 624; 338/215, 33

[56] References Cited

U.S. PATENT DOCUMENTS

| 3,826,139 | 7/1974 | Bachman | 200/84 C |
| 3,976,963 | 8/1976 | Kubler | 335/206 |
| 4,084,436 | 4/1978 | Smitherman | 73/313 |

Primary Examiner—Gerald P. Tolin
Attorney, Agent, or Firm—Peter K. Kontler

[57] ABSTRACT

Apparatus for ascertaining the upper level of oil or another liquid in a shallow or deep tank has a perforated vertical conduit which is installed in and extends to the bottom of the vessel. A vertical pipe is adjacent to the conduit and is sealed from the contents of the tank. The pipe contains electrical components which are connected to an indicating instrument and include a row of spaced-apart electric switches actuatable by a permanent magnet in a float which is movable up and down within the confines of the conduit so that the instrument receives signals denoting the actuated switch or switches and thus enables an attendant to ascertain the liquid level in the tank. The pipe and the conduit consist of several superimposed sections having flanges which are bolted or otherwise separably connected to each other to allow for convenient dismantling of the pipe and conduit and their transfer to storage or to another tank.

14 Claims, 9 Drawing Figures

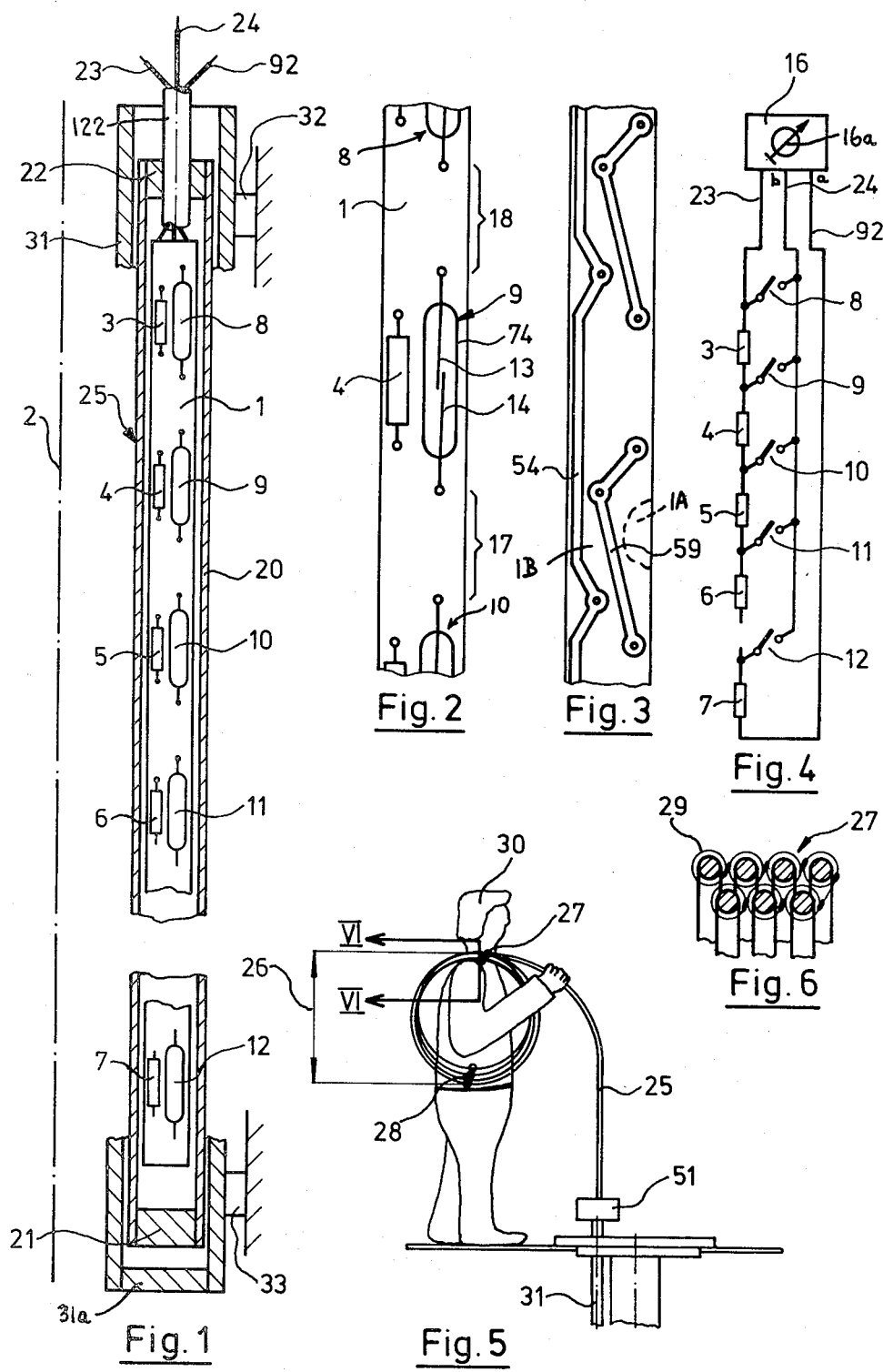

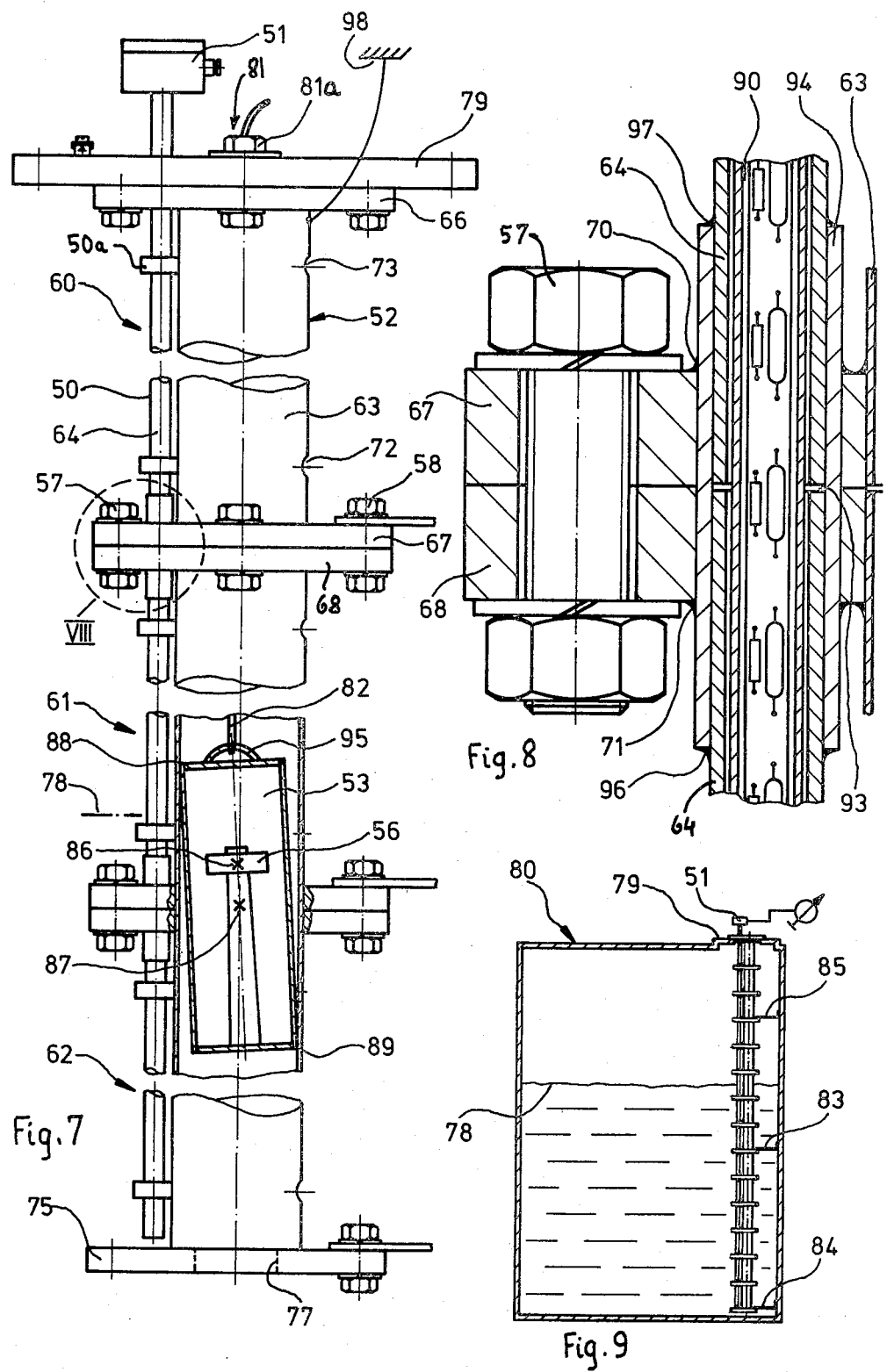

APPARATUS FOR ASCERTAINING THE UPPER LEVEL OF LIQUIDS IN TANKS OR THE LIKE

BACKGROUND OF THE INVENTION

The present invention relates to apparatus for ascertaining the upper level of a supply of a flowable medium, e.g., a liquid, which is stored in a vessel, e.g., in an upright cylindrical tank. More particularly, the invention relates to improvements in apparatus of the type wherein files or rows of resistors and associated electric switches are mounted on an elongated insulating carrier which is adjacent to the path of upward or downward movement of a float. The float rides on the body of liquid in the vessel and carries a permanent magnet which actuates the nearest switch or switches to thereby change the number of resistors which are connected in circuit with an indicating instrument.

A somewhat similar apparatus is disclosed in U.S. Pat. No. 3,656,074 granted Apr. 11, 1972 to Bevilacqua et al. The patented apparatus employs an insulating carrier adapted to be flexed to the extent which is necessary to allow for its introduction into a slightly arcuate insulating pipe. The carrier cannot be folded or convoluted. Therefore, the manipulation of such apparatus presents serious problems when their components must be transported between different locales of use, especially if the length of the component parts must suffice to ascertain the upper level of liquid in a relatively large vessel, e.g., in a vessel wherein the upper level of liquid is located at several meters above the bottom wall. Similar problems arise when the apparatus must be removed from a vessel for the purpose of inspection and/or repair.

Attempts to assemble the insulating carrier for switches and resistors of several shorter sections which are coupled to each other at the locale of use, provided that the depth of the vessel warrants the use of two or more interconnected carrier sections, have met with negligible success because any shortening or lengthening of the carrier invariably entails a considerable amount of work which must be performed by skilled operators. Such work involves proper calibration of the indicating instrument whose pointer or another mobile part indicates or records the ascertained upper level of liquid in the vessel. Moreover, the resistance of connections between the conductors on discrete sections of the insulating carrier must be taken into consideration whenever the length of the carrier is increased or reduced.

An object of the invention is to provide a novel and improved apparatus for ascertaining the upper level of a supply of flowable material in a vessel or the like.

Another object of the invention is to provide an apparatus whose parts can be readily taken apart for transport from one locale of use to another locale of use or to storage.

A further object of the invention is to provide a novel and improved guide for the switch actuating means in an apparatus of the above outlined character.

An ancillary object of the invention is to provide novel and improved means for changing the length of the apparatus.

A further object of the invention is to provide a novel and improved support for the switch actuating means in an apparatus of the above outlined character.

An additional object of the invention is to provide novel and improved means for testing and calibrating the apparatus.

A further object of the invention is to provide the apparatus with novel and improved means for permitting insertion and/or withdrawal of component parts which generate signals denoting the level of flowable material in a vessel wherein the apparatus is installed.

One feature of the invention resides in the provision of an apparatus for ascertaining the upper level of a supply of liquid which is confined in a vessel. The apparatus comprises an elongated conduit which is permeable to liquids and is installed in the vessel in upright position so that the upper level of liquid in the conduit at least approximates but normally matches the upper level of the supply of liquid in the vessel, a float which is disposed in the conduit and includes a permanent magnet or other suitable switch actuating means, an upright pipe adjacent to the conduit, and a plurality of electrical components sealingly confined in and being withdrawable from the pipe. The components include a row of spaced-apart electric switches which can be actuated by the actuating means whereby the actuation of a switch which is adjacent to the float denotes the upper level of liquid in the conduit. The pipe and the conduit comprise a plurality of superimposed sections and means for coupling the neighboring sections to each other. If the actuating means is or includes a permanent magnet, the pipe and the conduit preferably consist of magnetically neutral material. Those portions of the pipe which form part of the sections are preferably of the same length as the corresponding portions of the conduit.

The coupling means may comprise flanges at each end of each section and bolts and nuts or other suitable fastener means for securing the abutting flanges of neighboring sections to each other.

The sections are decoupled from each other prior to withdrawal of the pipe and conduit from a vessel, e.g., in order to transport such parts to storage or to a different locale of use. The number of assembled sections depends on the depth of the vessel. The electrical components can be installed on an insulating band which is confined in a flexible hose of insulating material and which is withdrawn from the pipe prior to separation of abutting flanges from each other.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary central longitudinal sectional view of an upright pipe which is mounted in a vessel, and a central longitudinal sectional view of a sheath forming part of a flexible body which is insertable into the pipe;

FIG. 2 is an enlarged elevational view of a portion of one side of a carrier forming part of the flexible body which is shown in FIG. 1;

FIG. 3 shows the other side of the carrier portion which is illustrated in FIG. 2;

FIG. 4 shows the electrical components on the carrier of FIG. 1 and an indicating instrument which is in circuit with such components;

FIG. 5 shows the flexigle body in the form of a package consisting of overlapping convolutions which are carried by a workman who is standing on the cover of a vessel and is in the process of introducing the leading of the flexible body into a pipe which is installed in the vessel;

FIG. 6 is an enlarged sectional view as seen in the direction of arrows from the line VI—VI of FIG. 5;

FIG. 7 illustrates a portion of an apparatus wherein the pipe and the conduit for the floating switch-actuating means are assembled of several sections;

FIG. 8 is an enlarged sectional view of a detail within the broken-line circle VIII shown in FIG. 7; and FIG. 9 is a central vertical sectional view of a vessel and a smaller-scale elevational view of the apparatus of FIG. 7.

DESCRIPTION OF THE PREFERRED EMBODIMENTS

Referring first to FIGS. 1 to 4, there is shown an elongated strip- or web-shaped carrier 1 which consists of flexible insulating material, e.g., a suitable synthetic plastic substance. The carrier 1 (hereinafter called web for short) is connected with a file or row of resistors including the resistors 3, 4, 5, 6, 7 and with a row or file of electric switches including those shown at 8, 9, 10, 11, 12. The number of resistors and switches can be increased above or reduced to less than five, depending on the length of the path 2 (indicated in FIG. 2 by a phantom line) of a switch-actuating permanent magnet 56 which is installed in a float 53 and on the desired degree of accuracy with which the apparatus is to indicate the momentary position of the float.

The magnet 56 serves to actuate the switches 8 to 12 each of which is an on-off switch including an elongated cylindrical envelope 74 which is filled with a suitable gas and contains two contacts 13 and 14. When the magnet 56 is adjacent to one of the switches (e.g., to the switch 9 of FIG. 2), it causes the contact 13 to engage the contact 14 and/or vice versa and to thus complete a portion of an electric circuit which includes the resistors 3–7 and switches 8–12. The envelopes 74 may consist of glass or another insulating material which sealingly confines the respective contacts and the supply of gas.

FIG. 4 shows that the resistors 3 to 7 are connected in series so that the number of resistors through which electric current must flow increases when the float 53 rises and vice versa. The arrangement of FIG. 4 resembles a potentiometer circuit. An indicating and/or recording instrument 16 which is connected with the resistors 3–7 and switches 8–12 via conductor means 23, 24 and 92 and a calibrated scale so that the position of the pointer is indicative of the level of the permanent magnet 56 and hence of the upper level of a supply of flowable material in the vessel in which the flowable material is confined. The instrument 16 can consitute a voltmeter which indicates the potential difference between the terminals a and b; such potential difference is a function of the number of resistors through which the current flows, i.e., a function of the position of the permanent magnet 56 and float 53.

Some of the conductors which connect neighboring resistors with each other and with the associated switches are shown in FIG. 3 which illustrates the rear side of the web 1. These conductors (including the conductors indicated by reference characters 54 and 59) preferably consist of readily flexible material (e.g., a metallic foil), at least in those regions (such as the regions 17 and 18 shown in FIG. 2) which are disposed between neighboring resistors and also between neighboring switches, as considered in the longitudinal direction of the web 1. The region 17 extends between the switches 9 and 10 (i.e., between the resistors 4 and 5), and the region 18 extends between the switches 8 and 9 (i.e., between the resistors 3 and 4). The conductors 54, 59 are soldered to the adjacent switches and/or resistors and extend across the region 17. These conductors do not appreciably influence the flexibility of the web in the region 17. The flexibility of the web 1 may but need not be very high; all that counts is to insure that the web 1 can be readily flexed between some or all of the neighboring switches so that it can be coiled not unlike a plastic or rubber hose (see FIG. 5) in order to reduce its dimensions during storage and/or transport. For example, the flexibility of the web 1 can (but need not be) sufficiently pronounced to enable a workman to flex the web in the region 17 so that the switch 9 overlies the switch 10 or vice versa. The same holds true for the region 18 and for the regions between other switches. If desired, the web 1 can be weakened in each of the regions including those shown at 17 and 18. This is indicated in FIG. 2 by broken lines, as at 1A, i.e., portions of the material of the web 1 can be removed to enhance the flexibility of the remaining (neck) portions 1B. As a rule, extremely high or at least very pronounced flexibility of the web 1 between neighboring switches is not absolutely necessary but does not harm.

The web 1 is sealingly confined in an elongated fluid-impermeable tubular sheath or hose 20 which consists of flexible insulating material. The length of the hose 20 is such that the web 1 can be stored therein in fully extended position. In fact, it is often preferred to select the dimensions of the hose 20 in such a way that the web 1 cannot be folded, pleated, crimped or otherwise shifted in its interior. The two end portions of the hose 20 are provided with sealing means 21 and 22 which prevent penetration of fluids into contact with the confined web 1. The sealing means 21 and 22 may constitute plugs which are inserted into and welded or otherwise sealingly secured to the respective end portions of the hose 20. The electrical conductors 23, 24 and 92 which connect the resistors 3–7 and switches 8–12 with the instrument 16 pass through a cable 122 which extends through the sealing means 22 and insures that the conductors are adequately insulated from the fluid medium whose upper level is to be determined with the assistance from the permanent magnet 56.

The parts 1 and 20 together constitute an elongated flexible body 25 wherein the web 1 is sealingly confined in the hose 20. As shown in FIG. 5, the body 25 can be coiled so that its diameter (indicated at 26) need not exceed 500 millimeters. The resulting package can be readily transported by a workman and can be stored in a small area. The length of the body 25 can be selected practically at will (e.g., the hose 20 can be 30 meters long) and depends on the length of the path 2, i.e., on the depth of the vessel wherein the float 53 is installed.

If desired, the structure of FIG. 5 can be supplied with one or more devices for releasably securing the neighboring convolutions of the hose 20 to each other. FIG. 5 shows two securing devices 27 and 28 which are disposed diametrically opposite each other with reference to the axis of the coiled body 25. As shown in FIG. 6, which illustrates the securing device 27, each securing device can comprise a plurality of discrete loop-shaped portions 29, one for each convolution of the body 25. Each loop-shaped portion 29 can be opened and closed independently of the other portions 29 so that the length of the non-convoluted portion of the body 25 can be increased or reduced while the remaining portion of the body 25 stays in convoluted condition. This facilitates the conversion of non-convoluted portion of the body 25 into convolutions when the non-convoluted portion is withdrawn from a vessel, and this also saves time for restoring the body 25 to the condition which is shown in FIG. 5. FIG. 5 further shows the manner in which a workman (denoted at 30) can introduce the leader of the body 25 into an upright pipe 31 which extends downwardly into and to the bottom of the vessel and has a length which at least equals the length of the hose 20. The convolutions of the body 25 are carried by one shoulder of the workman 30, and such person can release one convolution after the other so as to obtain an unobstructed length which suffices to advance the leader of the body 25 all the way to the lower end of the pipe 31. The pipe 31 consists of an electrically and magnetically neutral material, and its interior is sealed from the flowable material (e.g., liquid) in the vessel to further reduce the likelihood of penetration of flowable material into contact with the electrical components including the conductors, resistors and switches in the interior of the hose 20. The pipe 31 further shields the body 25 from corrosive action (if any) of the flowable material in the vessel. For example, the pipe 31 may consist of a suitable metallic material and is sufficiently rigid to retain its shape. Brackets 32 and 33 (two shown in FIG. 1) serve to fasten the pipe 31 to the vessel. The number of such brackets or analogous fastener means depends on the length and weight of the pipe 31. When the body 25 is inserted into the pipe 31 in a manner as shown in FIG. 1 (so that the sealing means 21 at the lower end of the hose 20 is adjacent to the bottom wall 31a of the pipe 31), the float 56 is adjacent to the outer side of the pipe 31 and the permanent magnet 56 in the float 53 maintains at least one of the switches 8-12 (namely, the nearest switch or switches) in closed position whereby the instrument 16 automatically indicates and/or records the upper level of flowable material in the vessel. The path 2 for the permanent magnet 56 is sufficiently close to the pipe 31 to insure that the magnet 56 can actuate at least one of the switches 8-12, i.e., that the instrument 16 furnishes an accurate indication in each position of the float 53.

It will be readily appreciated that the convoluted body 25 which is shown in FIG. 5 constitutes but one of several types of packages into which the web 1 and hose 20 can be converted as a result of flexibility of the parts 1 and 20 and due to the fact that the electrical components 3-7, 8-12 and/or 54, 59 on the web 1 are not damaged when the body 25 is converted into a package. For example, another mode of converting the body 25 into a compact package can include folding the body back and forth so that it consists of several elongated and more or less closely adjacent straight or substantially straight portions. All that counts is to insure that the body 25 can be readily converted into a package whose maximum dimension is only a small fraction of the length of the hose 20. When the body 25 is coiled in a manner as shown in FIG. 5, the diameter 26 of the convolutions preferably does not exceed 1500 mm and is most preferably a fraction of such dimension (e.g., 500 mm). This insures that the package can be readily manipulated by a workman.

The package which is shown in FIG. 5 can be further modified by flattening its convolutions so that the securing devices 27 and 28 are adjacent to each other. In such instances, the two securing devices can be replaced with a single securing device which includes means for releasably holding each half convolution of the package.

The conductors 54 and/or 59 may constitute wires, as long as they can be repeatedly flexed without any damage thereto when the body 25 is to be converted into a relatively small package or when the package is to be opened up so that the hose 20 can be introduced into the pipe 31. It is important that all electrical components which are located in the regions 17, 18 and similar regions between other switches be constructed and mounted in such a way that they allow for flexing of the respective regions and, at the same time, are not adversely affected by such flexing.

The hose 20 constitutes a protective enclosure for the web 1 during storage, during transport, during introduction into the pipe 31, during withdrawal from the pipe 31 as well as when the apparatus is in actual use. The material of the pipe 31 is magnetically neutral, i.e., it does not prevent the magnetic field of the permanent magnet 56 from influencing the adjacent switch or switches when the apparatus is in use. As mentioned above, the pipe 31 is preferably constructed in such a way that its interior is sealed against entry of liquids or other flowable materials. However, such hermetic sealing of the interior of the pipe from its exterior is not absolutely necessary if the hose 20 is capable of preventing any contact between the electrical components on the web 1 and a liquid medium.

FIGS. 7 to 9 illustrate an elongated upright pipe 50 which corresponds to the pipe 31 of FIGS. 1 and 5 and can receive a flexible body similar to or identical with the body 25 of FIG. 5. The indicating and/or recording instrument 51 shown in FIGS. 7 and 9 corresponds to the instrument 16 of FIG. 4. The pipe 50 is adjacent to a larger-diameter permeable elongated upright conduit or pipe 52 which confines a hollow cylindrical member or float 53 for the permanent magnet 56 (switch actuating means). The latter is an annular element whose magnetic field is sufficiently strong to close the nearest switch (or at least one of the nearest switches) in the pipe 50 when the flexible body is inserted into the pipe. The conduit 52, the pipe 50 and the means 50a for securing the pipe 50 to the conduit 52 consist of a magnetically neutral material.

The center of gravity (indicated at 86 in FIG. 7) of the float 53 is located at a level above the center (87) of the internal space or cavity of the float so that the latter tends to overturn and abuts against the internal surface of the conduit 52. The points of contact between such internal surface and the upper and lower end portions of the float 53 are respectively shown at 88 and 89. The inner diameter of the conduit 52 is less than the length of the float 53 so that the latter can tilt to a certain extent but remains in substantially upright position. The internal surface of the conduit 52 is smooth so that the conduit offers negligible resistance to upward and downward movements of the float when the liquid level 78 in the vessel 80 (and hence in the conduit 52) rises or descends. The conduit 52 is grounded as shown at 98 in the upper portion of FIG. 7.

The float 53 consists of a metallic material and is in permanent conductive contact with the conduit 52 (as at 88 and 89). Since the conduit 52 is grounded, the float 53 is not likely to accumulate any electrostatic charges.

The liquid-permeable conduit of FIGS. 7 to 9 can be several meters long. If the entire apparatus (including the conduit 52, the pipe 50 and the flexible body which is insertable into the pipe 50) is to be transported from vessel to vessel, considerable length of the parts 50 and 52 could cause problems during transport from vessel to vessel. Therefore, such parts are preferably assembled of several (preferably interchangeable) superimposed sections three of which are shown in FIG. 7, as at 60, 61 and 62. The sections have abutting flanges and can be secured to each other by bolts, screws or other suitable fastener means.

The section 60 comprises a portion 63 of the conduit 52, and the ends of the portion 63 are provided with coupling flanges 66, 67 which are welded or otherwise bonded thereto. The section 60 further comprises a portion 64 of the pipe 50. The length of the portion 64 is identical with that of the portion 63. The lower flange 67 of the section 60 is separably connected to the upper flange 68 of the section 61 therebelow by bolts and nuts 57, 58. These connectors are removed if an operator wishes to decouple the section 60 from the section 61, e.g., in order to transport the dismantled apparatus to the next vessel or to place the apparatus into storage. As shown in FIG. 8, the clearance 93 between the portions 64 of the sections 60, 61 is surrounded by a metallic sleeve 94 which sealingly engages the external surfaces of the respective ends of such portions 64. The sleeve 94 is welded to the portion 64 of the section 60, as at 97, and to the portion 64 of the section 61, as at 96. These seams are fluidtight and are applied at the locale of use. Furthermore, the sleeve 94 is welded to the flanges 67 and 68 (the respective seams are shown at 70 and 71). Alternatively, the sleeve 94 can be bonded to the section 60 or 61 prior to transport to a different locale; for example, such sleeve can be permanently connected with the section 60 (by seams 70 and 97). This reduces the assembly time at the location where the apparatus is to be installed in a vessel, e.g., in a tank for the storage of liquids.

The interior of the conduit 52 is not sealed from the interior of the vessel. On the contrary, the conduit 52 is preferably provided with one or more inlet openings (such as those shown at 72 and 73 in FIG. 7) so as to enable the fluid medium to flow from the interior of the conduit into the interior of the vessel or vice versa. This insures that the upper level of fluid medium in the conduit 52 is always identical with the upper level of such medium in the vessel. Each portion 63 of the conduit 52 is preferably formed with at least one opening 72 and/or 73.

The lower flange 75 of the lowermost section 62 is formed with an axial passage 77 which allows medium to enter the conduit 52 from below. The flange 75 serves as a stop for the float 53; however, the medium which enters the conduit 52 via passage 77 and inlet openings 72, 73 immediately causes the float 53 to rise if the upper level of the supply of medium in the vessel is sufficiently high. In FIG. 9, the upper level of a body of liquid in the vessel 80 is indicated at 78.

The upper flange 66 of the uppermost section 60 is separably coupled to the cover plate or lid 79 of the vessel 80 by screws, bolts or analogous fasteners. FIG. 9 further shows that the vessel 80 (whose height may be in the range of 30 meters) can accommodate an equally long conduit which consists of fourteen sections, i.e., each section can be approximately two meters long. The top wall of the hollow cylindrical float 53 is preferably provided with an eyelet 95 for the lower end portion of a cable cord or another suitable flexible element 82. The latter extends upwardly through the bore or hole of a plug 81 in the lid 79 and can be lifted or lowered so as to move the float 53 toward or away from the flange 66. By rotating a nut 81a of the plug 81, the flexible element 82 can be fixed in a selected position. The length of this flexible element at least equals the length of the fully assembled conduit 52. The workman in charge will free the flexible element 82 and will raise or lower the float 53 in order to ascertain whether or not the electric circuit of the apparatus is operative. Furthermore, the flexible element 82 enables the workman to calibrate the apparatus, e.g., by shifting the resistors and switches in the longitudinal direction of the web. When the apparatus is properly installed in a vessel, the element 82 is detached from the eyelet 95 and it withdrawn from the conduit 52 through the bore or hole of the plug 81.

FIG. 9 further shows three clamps 83, 84 and 85 which detachably connect the sections of the conduit 52 to the cylindrical wall of the vessel 80.

When the apparatus is to be dismantled, the sections of the conduit 52 and pipe 50 are separated form each other, and the flexible body 90 (corresponding to the flexible body 25 of FIG. 5) is converted into a small package, e.g., it is coiled up in a manner as shown in FIG. 5. This renders it possible to readily transport the dismantled apparatus to another locale of use or to storage. If the apparatus is to be transported to a different locale of use, the sections of the conduit 52 and pipe 50 are assembled in a first step, and the flexible body 90 is inserted into the pipe 50 in a manner as shown in FIG. 5 for the pipe 31 and body 25. The apparatus is thereupon calibrated with the flexible element 82 before the latter is detached from the float 53 and is removed from the conduit 52.

The supply of liquid which is stored in the vessel 80 may be oil, and the vessel can be installed in or on a watercraft. Such vessels are often very deep, i.e., the length of the pipe 50 and conduit 52 is sufficient to warrant the assembly of such parts from several sections. The number of assembled sections will depend on the depth of the vessel, i.e., certain sections can be retained in storage when the apparatus is to be installed in a relatively shallow vessel.

A further important advantage of the improved apparatus is that the relatively short sections can be manufactured at a fraction of the cost of making relatively long pipes and/or conduits. Moreover, the manufacture can produce and store a large number of identical sections to thus insure that such sections are available for assembly of very long apparatus as well as that a defective section can be replaced with a new section without delay.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the claims.

I claim:

1. Apparatus for ascertaining the upper level of a supply of liquid which is confined in a vessel, comprising an elongated conduit which is permeable to liquids and is installed in said vessel in upright position so that the upper level of liquid in said conduit at least approximates the upper level of said supply of liquid; a float disposed in said conduit and including switch actuating means; an upright pipe adjacent to said conduit; and a plurality of electrical components sealingly confined in and being withdrawable from said pipe, said components including a row of spaced-apart electric switches actuatable by said actuating means whereby the actuation of a switch which is adjacent to said float denotes the upper level of liquid in said conduit, said pipe and said conduit comprising a plurality of superimposed sections and means for coupling the neighboring sections to each other.

2. The apparatus of claim 1, wherein said pipe and said conduit consist of magnetically neutral material and said actuating means includes a permanent magnet.

3. The apparatus of claim 1, wherein each of said sections includes a portion of said conduit and an equally long portion of said pipe.

4. The apparatus of claim 3, wherein each of said sections further comprises a pair of spaced-apart flanges, the respective portions of said pipe and said conduit being disposed between and being bonded to said flanges and said coupling means including means for fastening each flange of a section to the adjacent flange of a neighboring section.

5. The apparatus of claim 4, wherein said fastening means comprises mating nuts and bolts.

6. The apparatus of claim 4, wherein said flanges are welded to the respective portions of said pipe.

7. The apparatus of claim 1, wherein each portion of said conduit has at least one opening which allows the liquid to flow between the interior of said vessel and the interior of said conduit.

8. The apparatus of claim 1, wherein said conduit consists of magnetically neutral metallic material and is connected to the ground.

9. The apparatus of claim 1, wherein said float includes a hollow member and said actuating means is disposed in said hollow member.

10. The apparatus of claim 9, wherein said member defines a cavity and the center of gravity of said member plus said actuating means is disposed above the center of said cavity so that said member tends to overturn and is thereby maintained in contact with said conduit.

11. The apparatus of claim 1, further comprising a flexible element extending downwardly into said conduit and separably connected to said float, said element being movable relative to said conduit to thereby move said float up or down in the absence of liquid in the interior of said conduit.

12. The apparatus of claim 11, wherein said conduit has an upper end portion and further comprising means for separably securing said flexible element to said upper end portion.

13. The apparatus of claim 11, wherein said float has an eyelet and said flexible element has a lower end portion separably connected with said eyelet.

14. The apparatus of claim 1, wherein said conduit has an upper end portion and a plug in said upper end portion, said plug having a bore for said flexible element and said element being withdrawable from said conduit via said bore upon detachment of said lower end portion from said eyelet.

* * * * *